United States Patent Office 3,424,631
Patented Jan. 28, 1969

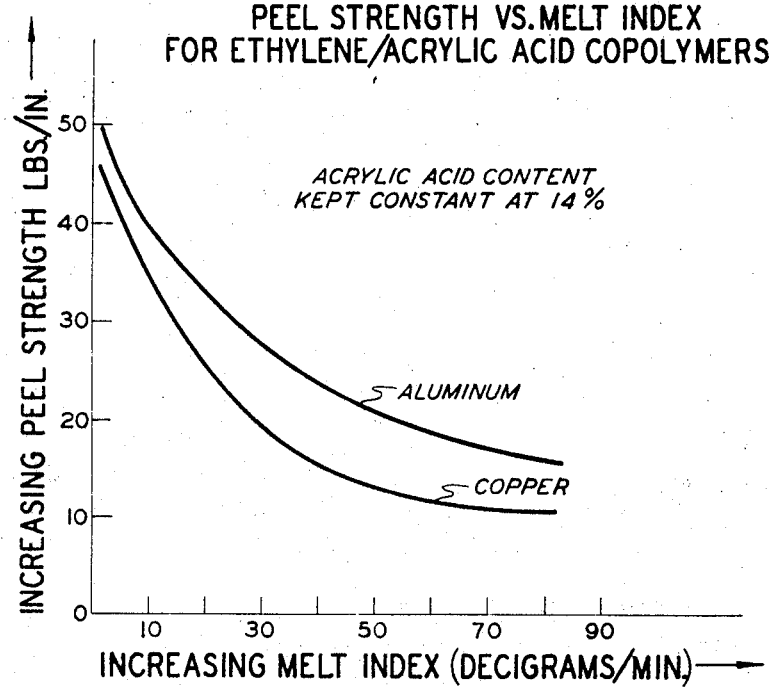
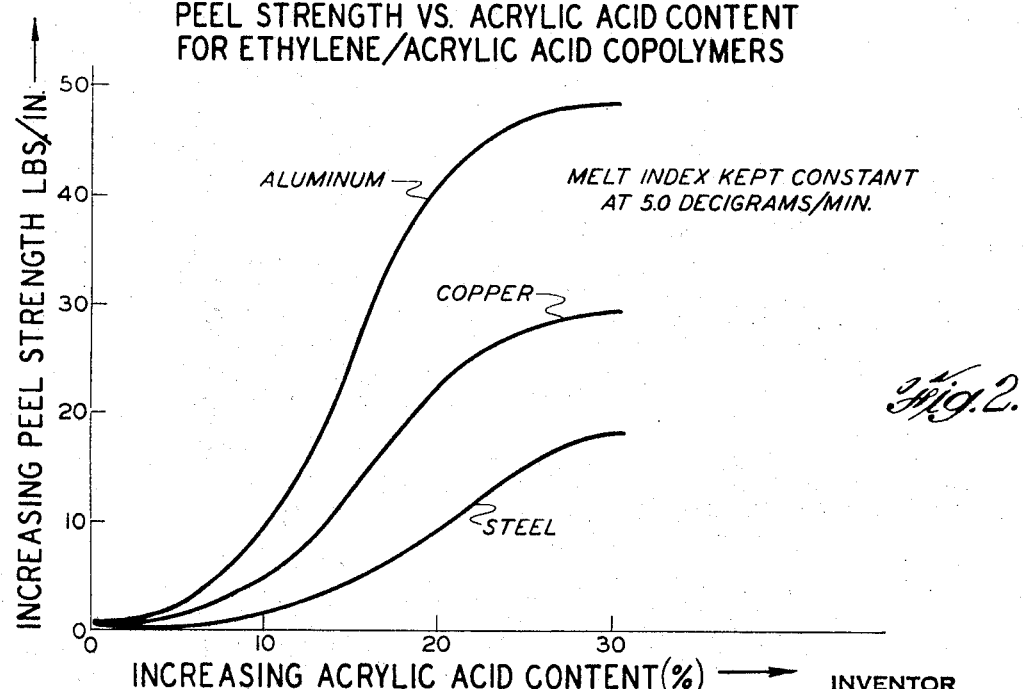

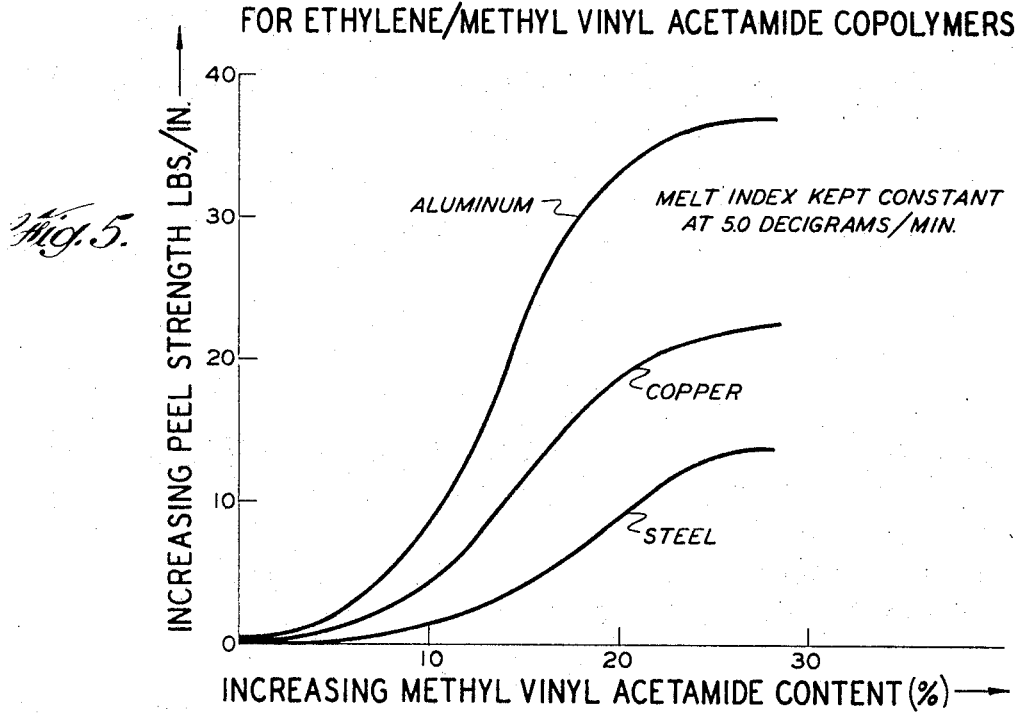
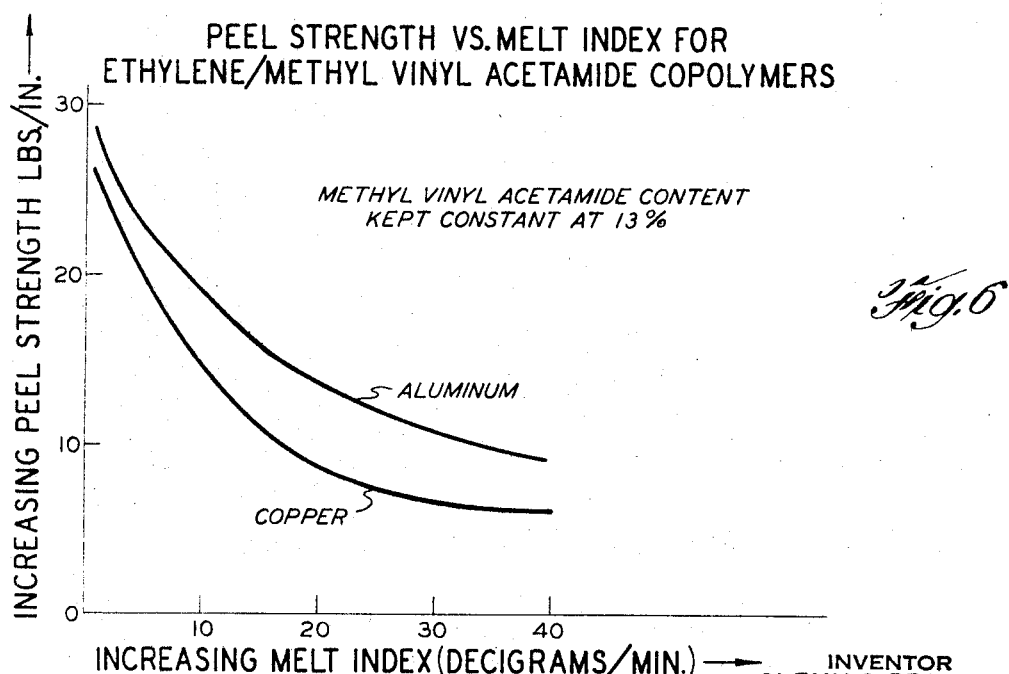

3,424,631
METHOD OF PROVIDING SHEATHED CABLES WITH CONTROLLED INSULATION STRIPPABILITY
Glenn S. Peacock, Somerville, N.J., assignor to Union Carbide Corporation, a corporation of New York
Filed Oct. 15, 1965, Ser. No. 496,625
U.S. Cl. 156—51             20 Claims
Int. Cl. H01b 13/14, 13/24

This invention relates to sheathed cables and more particularly to a method of providing such cables with controlled insulation strippability.

Various types of cables including telephone, power, and coaxial cables have outer conductor or protective sheaths commonly made of aluminum, copper, lead or steel. These sheaths in turn are covered with an outermost jacket which serves both to insulate and protect the sheath. Polymeric materials such as polyolefins and particularly polyethylene have been used for this purpose. The adhesion of the polyolefin jackets to these sheaths has not been satisfactory as demonstrated during both aerial installation and burial installation of these cables. Either the polyolefin jacket bunches into shoulders as the cables are pulled over elevated cross arms, dragged through trenches or plowed into trenches or they adhere so tenaciously that they cannot be stripped from the sheath to make connections in the field or during pulling, the outer polyolefin jacket is stretched and made longer than the sheathing. In addition, present day cables require thick metal sheaths to prevent buckling of the cable in handling and during use.

Attempts have been made to provide the metal sheaths with adhesive primers before applying the outer polyolefin jacket. In other words, a particular metal sheath is preprimed or solution coated with a particular adhesive polymer and stored until the outer jacket is applied thereto. Such pre-primed sheaths are limited to certain levels of strippability and field application or use is limited to that particular adhesive coated metal sheath. Such preprimed sheaths present an inventory problem for the cable manufacturer because he is required to have numerous rolls of adhesive coated metal sheaths, each having varied adhesive thicknesses depending on the end use of the cable. These rolls of adhesive coated metal sheaths weigh as much as 200 pounds each and are very bulky, consequently a serious storage problem exists.

Accordingly it is an object of this invention to provide a method for covering sheathed cables with continuous olefin polymer jackets which firmly adhere to but can be stripped from the sheathing under controlled conditions and which do not exhibit the aforementioned undesirable characteristics of present day cables.

In accordance with the present invention, there is provided a method of preparing cables having protective sheaths, with controlled insulation strippability which method comprises placing circumferentially or longitudinally onto the sheathed cable a covering of a film of ethylene copolymer of ethylene monomer polymerized with a copolymerizable polar monomer wherein the ethylene copolymer contains from about 0.5 percent to about 45 percent polymerized polar monomer and applying a polyolefin outer jacket to the ethylene copolymer whereby the polyolefin outer jacket firmly adheres to but is strippable from the sheath, the degree of adhesion or strippability of said polyolefin outer jacket to the sheath being proportional to the amount of the copolymerized polar monomer and the molecular weight of the copolymer.

For purposes of the invention, it is convenient to define the molecular weight of the ethylene copolymer in terms of melt index as determined by ASTM D–1238. The melt index of the ethylene copolymer of the present invention, therefore, is from about 0.01 to about 350, preferably from about 0.1 to about 100.

In the drawing:

FIG. 1 is a graph showing the relationship of peel strength to melt index for ethylene/acrylic acid copolymers.

FIG. 2 is a graph showing the relationship of peel strength to acrylic acid content for ethylene/acrylic acid copolymers.

FIG. 5 is a graph showing the relationship of peel strength to methyl vinyl acetamide content for ethylene/methyl vinyl acetamide copolymers.

FIG. 6 is a graph showing the relationship of peel strength to melt index for ethylene/methyl vinyl acetamide copolymers.

Figure 4:
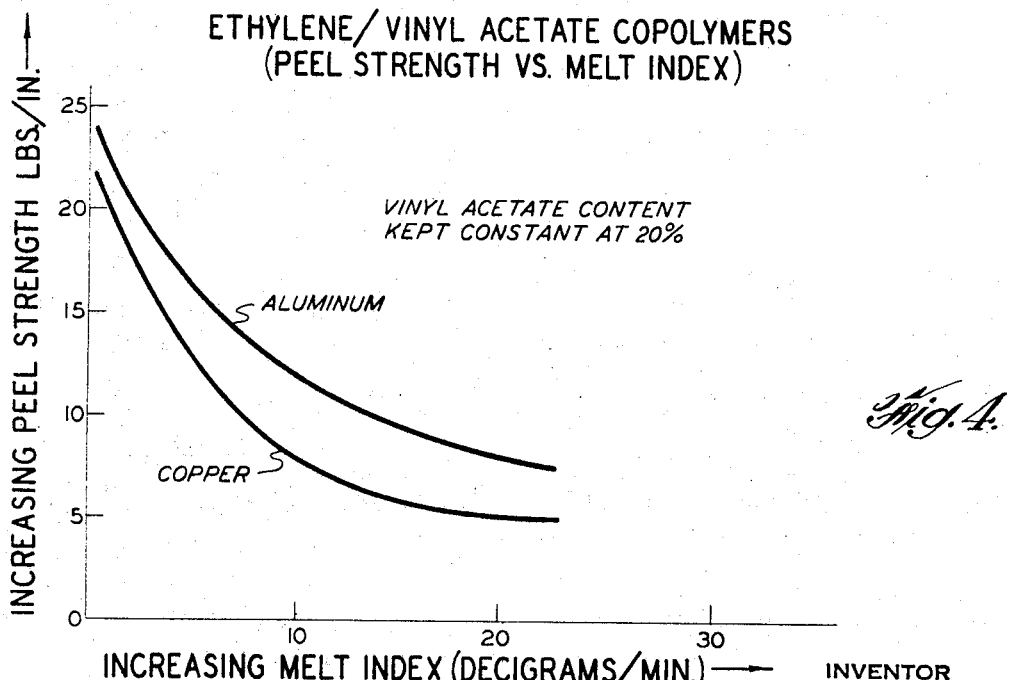
FIG. 4 is a graph showing the relationship of peel strength to melt index for ethylene/vinyl acetate copolymers.

Referring now to the drawing, there is shown in FIG. 1 that maintaining the acrylic acid content of the copolymer at a constant level, for example 14 percent, peel strength of the copolymer can be controlled by varying the melt index of the copolymer. Thus, as FIG. 1 readily demonstrates, the peel strength of the ethylene copolymer increases as the melt index decreases. FIGS. 4 and 6 reaffirm this relationship, employing constant levels of vinyl acetate and methyl vinyl acetamide, respectively in place of acrylic acid.

As shown in FIG. 2, by maintaining the melt index of the copolymer at a constant level, the peel strength of the copolymer can also be controlled by varying the comonomer content, for example acrylic acid, of the copolymer. Thus as the acrylic acid content increases, the peel strength increases accordingly. FIG. 2 also demonstrates a higher peel strength when aluminum is used as the sheathing material as opposed to copper and steel, the latter having the lowest peel strength for the same amount of acrylic acid content.

Figure 3:
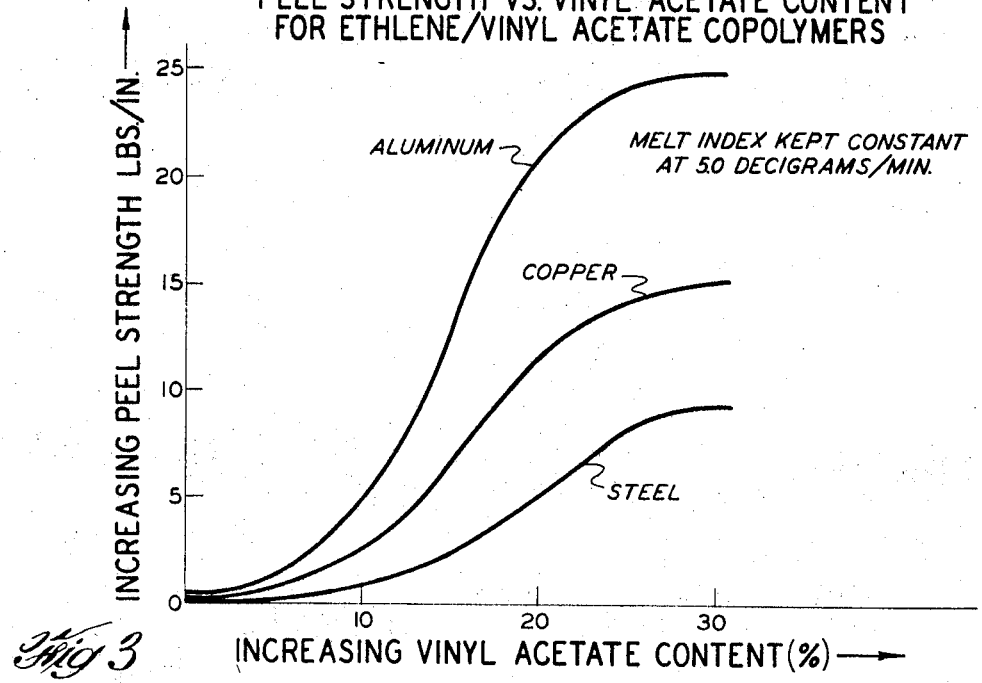
FIG. 3 is a graph showing the relationship of peel strength to vinyl acetate content for ethylene/vinyl acetate copolymers.

Relationships similar to FIG. 2 are demonstrated by FIGS. 3 and 5. The only difference being in the comonomer employed. FIG. 3 manifests that peel strength of the copolymer increases with increasing vinyl acetate content of the copolymer and FIG. 5 shows the same increase of peel strength as the methyl vinyl acetamide content of the copolymer is increased.

Thus, as indicated by FIG. 2, for example, when the ethylene copolymer contains about 0.5 percent polymerized polar monomer, a peel strength of less than 2 pounds per inch is required to strip the jacketing material from the metal sheath, whereas when the polar monomer content of the copolymer is 30 percent, for example, a peel strength of almost 50 pounds per inch is required to accomplish the same result. Thus, by varying the polar monomer content of the copolymer, one can control strippability.

It has been discovered by this invention that superior adhesion of a polyolefin outer jacket to a protective sheath of a cable can be maintained and controlled by wrapping a thin layer of the aforementioned ethylene copolymer film onto the sheath prior to the extrusion of the polyolefin outer jacket. Such ethylene copolymers exhibit good adhesive properties to a wide variety of materials. Moreover, these copolymers are capable of being formed into non-tacky films which can then be applied to the selected surfaces by heat and pressure. Because the ethylene copolymers can be employed as films, the following advantages over the pre-primed metal sheaths result:

(a) No liquids need be handled;

(b) Controllable bonding and uniform adhesion are obtained;

(c) The finished cable is more buckle resistant on bending;

(d) The elimination of many heavy rolls of pre-primed metal sheaths reduces inventory problems;

(e) The thickness of the adhesive coating can be widely varied.

The term "polar monomer" is used in the present specification and claims to denote a substituted α-olefin which readily copolymerizes with ethylene and contains a functional group, incorporates a hetero atom, and contributes to a measurable dipole moment. This differentiates from other α-olefins such as propylene, butylene, hexane and the like which do not have hetero atoms nor readily measurable dipole moments. Ethylene copolymers in this invention contain from about 0.5 percent to about 45 percent polymerized polar monomer although amounts of from about 1 percent to about 25 percent are preferred.

Illustrative of the polar monomers and mixtures thereof which can be copolymerized with an olefin monomer to form thermoplastic polymers which can be utilized in accordance with the present invention are the following: vinyl and vinylidene halides such as vinyl chloride, vinylidene chloride, vinylidene bromide and the like; vinyl esters such as vinyl formate, vinyl acetate, vinyl propionate, vinyl butyrate, vinyl 2,4-dimethylpentoate, vinyl pelargonate, vinyl stearate, vinyl pivalate, vinyl tert-butyl-acetate, vinyl chloroacetate, vinyl chloropropionate, vinyl benzoate, vinyl chlorobenzoate, vinyl diethylacetate, vinyl beta, gamma-dimethyl valerate, vinyl thioacetate, vinyl alcohol and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, lauryl acrylate, hexadecyl acrylate, octadecyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, methyl vinylacetamide, acrylonitrile, chloroacrylonitrile, methacrylonitrile, ethacrylonitrile, and the like; alkyl esters of maleic and fumaric acid such as dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrolidine, ethyl methylene malonate and the like.

The ethylene copolymers preferred in the composition should be of a grade suitable for extruding film and having a density of about 0.90 to 0.96.

The preferred process for applying the adhesive of the instant invention consists of extruding the ethylene copolymer to the required thickness using a flat film or tubular die. The fabricated and trimmed film is then wrapped or placed circumferentially or longitudinally about the metal sheath or substrate and in contact therewith. The metal sheath can be smooth, corrugated, crimped or embossed for mechanical strength. Aliphatic hydrocarbon greases and oils commonly used in crimping, corrugating and forming operations need not be removed as the polar ethylene copolymers wet through these oils to achieve adhesion. Outer jacketing material, for instance, containing a polymer of ethylene is extruded over the adhesive film-metal combination. The residual heat of extrusion is utilized to bond the metal-adhesive film-polyolefin jacketing combination. Such a technique eliminates additional external heat sources for assuring adhesion. Furthermore, continuous, uniform adhesion is realized. It should be noted that the thickness of the adhesive coating can be applied as a thin film such as in the order of 0.1 mil or as a thick film such as in the order of from about 10 to about 50 mils. The choice of thickness is dependent on the end use of the cable. However, a preferable film thickness is in the order of from about 0.3 to about 2.0 mils.

While it is preferred that the polyolefin outer jacket be of thermoplastic such as polyethylene, polypropylene, polybutene and the like, this invention is also applicable to cables having an outer jacket of crosslinkable polyethylene, chlorosulfonated polyethylene, neoprene, Thiokol, butyl rubber, natural rubber, polyvinyl fluoride, polyvinylidene fluoride and the like.

For long term weather protection, the polyolefin outer jacket as a rule can contain carbon black which can be of any desired type and particle size. Finely divided carbon black, that is, carbon black having an average particle size of less than about 60 millimicrons, carbon black beads and carbon black in fluffy form can all be used for purposes of the present invention.

The preferred metal sheathing materials used in the present invention are aluminum, copper, lead and steel and their commercially available alloys although other electrically conductive metals can be used if desired.

The present invention is particularly useful in fabricating telephone cables having the aforementioned metal sheaths and a polyethylene outer jacket, however, its utility in the fabrication of power cables having metal sheaths and synthetic outer jacketing will be obvious to anyone skilled in the art. Thus, by wrapping a continuous layer of one of the aforementioned ethylene copolymer adhesives on the metal sheath of a cable, superior adhesion of a polyolefin outer jacket to the sheath is maintained. The strippability of the polyolefin jacket is controlled by the type of adhesive film applied to the sheath. Consequently, a cable manufacturer need only have to maintain in storage several rolls of the adhesive films each weighing about 0.2 to 20 pounds and one roll of the metal sheathing material as opposed to maintaining multitudinous rolls of present day pre-primed metal sheathing which weigh as much as 200 pounds each. Thus large and space consuming inventories are eliminated and the manufacturer could select the roll of adhesive film according to the degree of adhesion he desired. Furthermore, with the use of the adhesive film in accordance with the present invention, a cable is produced which is resistant to buckling on bending allowing thin metal sheaths to be used without sacrifice to cable toughness, bunching and stretching. Another important advantage of the employment of the adhesive film of the present invention is that the cable is rendered corrosion resistant. For example if the cable becomes cracked or broken and water enters, the adhesive film acts as a barrier localizing the water and preventing such water from traveling any further within the cable beyond the point of entry. Consequently, such cable damage causes no sacrifice in electrical properties of the cable.

Admixing of the desired polyolefin and carbon black for jacketing can be accomplished in any convenient manner as long as there is a thorough distribution of the carbon black throughout the resultant composition. For example, a polyolefin and the carbon black can be admixed at a temperature which is sufficiently high so that the components, as they are being admixed, are also being fluxed. The result of such mixing operation is that a composition of greater homogeneity is produced. The "hot" mixing can be satisfactorily carried out in a Banbury mixer, on a two-roll mill and the like.

The amount of carbon black used will vary and depend in part upon the polyolefin which is to be employed as the outer jacket. Generally, the amount of carbon black used will be about 0.5 percent by weight to about 5.0 percent by weight, based on the combined weight of the polyolefin and the carbon black.

The following non-limiting specific examples serve to more fully demonstrate the novel features of the invention.

EXAMPLE 1

Using a 1½ inch commercial extruder fitted with a polyethylene screw, 20:1 length to diameter ratio, and a 3.1:1 compression ratio and a 5 inch wide slot film die (lip opening 5 mils), an ethylene/acrylic acid copolymer having an ethylene content of 86 percent, an acrylic acid content of 14 percent and a melt index of 5.0 was extruded into 1.5 mil film cooled, trimmed and wound on a core. Extrusion conditions:

(1) Screw speed _____ r.p.m__ 15
(2) Material temperature _____ °C__ 140
(3) Chill roll temperature _____ °C__ 30
(4) Extrusion rate _____ lbs./hour__ 16

EXAMPLE 2

Using ASTM Test number D-903-49 for peel adhesive strength measurements, the relationship between melt index and peel strength for ethylene-acrylic acid copolymers was investigated. Peel strength samples were prepared by pressing metal foil/copolymer 1.5 mils/metal foil composites in a steam press at 160° C. for three minutes and then cooling.

As shown in FIGURE 1, by keeping the acrylic acid content of the copolymer constant the peel strength of the copolymers can be controlled by varying the melt index of the copolymers. The peel strength increases as the melt index decreases.

EXAMPLE 3

Similarly, as in Example 2, the relationship of acrylic acid comonomer content to peel strength was determined for ethylene-acrylic acid copolymers at constant melt index. Sample preparation and test methods employed were identical to Example 2.

As shown in FIGURE 2 by maintaining constant melt index, the peel strength can also be controlled by varying the acrylic acid content of the copolymer. Note that as the acrylic acid content increases, the peel strength increases accordingly. FIGURE 2 also demonstrates a higher peel strength when aluminum is used as a sheathing material as opposed to copper and steel, the latter having the lowest peel strength for the same amount of acrylic acid content.

EXAMPLE 4

Similarly, as in Example 3, the relationship of vinyl acetate content to peel strength for ethylene/vinyl acetate copolymers was determined.

As shown in FIGURE 2, the results obtained are similar to FIGURE 2.

EXAMPLE 5

As in Example 2, the relationship of melt index to peel strength for vinyl acetate copolymers was studied.

This relationship as shown in FIGURE 4 is consistent with that of FIGURE 1.

EXAMPLE 6

Likewise, as in Example 3, the relationship of peel strength to methyl vinyl acetamide content for ethylene/methyl vinyl acetamide copolymers was determined.

As shown in FIGURE 5, the results obtained closely adhere to those as shown in FIGURE 2.

EXAMPLE 7

The relationship of peel strength to melt index for ethylene/methyl vinyl acetamide copolymers is shown in FIGURE 6.

Maintaining a constant methyl vinyl acetamide content, results similar to those as shown in FIGURE 1 were obtained.

EXAMPLE 8

A complete telephone cable was fabricated by wrapping a core consisting of bundles of wire singles with an aluminum shield. Subsequently, this construction was extrusion coated with an outer jacket of black polyethylene jacketing compound. The peel strength required to strip the jacket from the shield was 0.8 lb./inch.

EXAMPLE 9

A complete telephone cable was fabricated by wrapping a core consisting of bundles of wire singles with a corrugated copper shield. Subsequently, this construction was extrusion coated with an outer jacket of black polyethylene jacketing compound. The peel strength required to strip the jacket from the shield was 1.1 lbs./inch.

EXAMPLES 10 THRU 17

The following table records the peel strength necessary to strip the jacket of Example 8 from metallic shielding when the shielding was first wrapped with a 1.5 mil film (prepared as in Example 1) of adhesive ethylene copolymer and then subsequently jacketed.

| Ex. | Metal shield | Polar comonomer | Comonomer content, percent | Melt index | Peel strength, lbs./inch |
|---|---|---|---|---|---|
| 10 | Aluminum | Acrylic acid | 14 | 2.0 | 41.0 |
| 11 | do | do | 14 | 20.0 | 22.0 |
| 12 | do | do | 3.20 | 20.0 | 5.0 |
| 13 | do | Vinyl acetate | 3.0 | 10.0 | 3.0 |
| 14 | Copper | Acrylic acid | 14 | 2.0 | 29.0 |
| 15 | do | Vinyl acetate | 3 | 10.0 | 2.3 |
| 16 | Corrugated copper | Acrylic acid | 14 | 20.0 | 21.0 |
| 17 | do | Vinyl acetate | 3.0 | 10.0 | 1.6 |

Thus, again, the above table reaffirms the findings that peel strength can be controlled by varying the comonomer content or the melt index of the copolymer. Thus, as discovered in Example 10, when the comonomer content of the copolymer is 14 percent and the melt index is low, a high peel strength is demonstrated. In contrast, the same comonomer level as in Example 10 was applied in Example 11 but the melt index of the copolymer was 10 times as much. Consequently, the peel strength was reduced to a value about half as much as that shown by Example 10. In Example 12, the melt index was kept constant at 20.0 as Example 11, but the comonomer content was decreased. Consequently, a proportionate decrease in peel strength was found. The aforementioned three examples employed aluminum as the metal sheath.

Example 14 was conducted with all factors the same as Example 10 except copper was used as the metal sheath. As shown, in the table, a lower peel strength was exhibited for the same acrylic acid content and melt index of the copolymer. This same result was demonstrated by Examples 13 and 15 when vinyl acetate was used as the comonomer.

Example 16 was conducted as Example 11 with corrugated copper substituted for aluminum as the metal sheath, however little difference in peel strength was observed. However, Example 17 which was conducted in a manner similar to Example 13, substituting corrugated copper for aluminum, it was found that the peel strength decreased by approximately 50 percent.

EXAMPLE 18

A 6 inch sample of cable prepared in Example 8 and a 6 inch sample of cable from Example 11 were caused to have the shield and jacket punctured and were immersed in 0.2 N sodium hydroxide solution at room temperature for two weeks. After this time the aluminum shield in the sample from Example 8 showed extensive signs of pitting and corrosion throughout the shield. The sample from Example 11 showed slight corrosion localized only at the point of puncture. No evidence for corrosion was found elsewhere in the sample.

What is claimed is:

1. A method of providing cables having protective metal sheaths with controlled insulation strippability which method comprises:
(a) providing said metal sheathed cable with a covering of a fabricated film of ethylene copolymer of ethylene monomer polymerized with a copolymerizable polar monomer wherein said ethylene copolymer contains from about 0.5 percent to about 45 percent polymerized polar monomer, and
(b) applying a polyolefin outer jacket to said ethylene copolymer whereby said polyolefin outer jacket firmly adheres to but is strippable from said metal sheath, the degree of adhesion of said polyolefin outer jacket to said metal sheath being proportional to the amount of said copolymerized polar monomer and the molecular weight of said copolymer.

2. Method of claim 1 wherein said copolymer has a melt index of from about 0.01 to about 350.

3. Method of claim 1 wherein said covering of ethylene copolymer is ethylene/acrylic acid.

4. Method of claim 1 wherein said covering of ethylene copolymer is ethylene/vinyl acetate.

5. Method of claim 1 wherein said covering of ethylene copolymer is ethylene/ethyl acrylate.

6. Method of claim 1 wherein said covering of ethylene copolymer is ethylene/methylacrylic acid.

7. Method of claim 1 wherein said covering of ethylene copolymer is ethylene/methyl vinyl acetamide.

8. Method of claim 3 wherein said covering of ethylene/acrylic acid has thickness of from about 0.1 to about 50 mils.

9. Method of claim 3 wherein said polyolefin outer jacket contains a polymer of polyethylene.

10. Method of claim 3 wherein said polyolefin outer jacket contains a polymer of 2-chloro-1,3-butadiene.

11. Method of claim 9 where said polyolefin outer jacket contains a polymer of polyethylene admixed with carbon black.

12. Method of claim 1 wherein said cable sheathing is aluminum.

13. Method of claim 1 wherein said cable sheathing is steel.

14. Method of claim 1 wherein said cable sheathing is copper.

15. Method of claim 1 wherein said cable sheathing is lead.

16. A method of providing cables having protective metal sheaths with controlled insulation strippability which method comprises:
(a) providing said metal sheathed cable with a covering of a fabricated film of ethylene copolymer of ethylene monomer polymerized with a copolymerizable polar monomer wherein said ethylene copolymer contains from about 1 percent to 25 percent polymerized polar monomer, and
(b) applying a polyolefin outer jacket to said ethylene copolymer whereby said polyolefin outer jacket firmly adheres to but is strippable from said metal sheath, the degree of adhesion of said polyolefin outer jacket to said metal sheath being proportional to the amount of said copolymerized polar monomer and the molecular weight of said copolymer.

17. Method of claim 16 wherein said copolymer has a melt index of from about 0.1 to about 100.

18. Method of claim 16 wherein said covering of ethylene copolymer is ethylene/acrylic acid.

19. Method of claim 18 wherein said covering of ethylene/acrylic acid has a thickness of from about 0.1 to about 50 mils.

20. Method of claim 18 wherein said polyolefin outer jacket contains a polymer of polyethylene.

References Cited

UNITED STATES PATENTS

| | | | |
|---|---|---|---|
| 3,043,716 | 7/1962 | Busse et al. | 156—244 X |
| 3,332,138 | 7/1967 | Garner | 29—430 |

EARL M. BERGERT, *Primary Examiner.*

T. R. SAVOIE, *Assistant Examiner.*

U.S. Cl. X.R.

156—53, 56; 174—120